US008537694B2

(12) United States Patent
Ilan (10) Patent No.: US 8,537,694 B2
(45) Date of Patent: Sep. 17, 2013

(54) PROCESSING OF PACKETS INCLUDING PROCESSING INSTRUCTIONS AND FORWARDED IN COMMUNICATION NETWORKS

(75) Inventor: Amir Ilan, Hod Hasharon (IL)

(73) Assignee: Dialogic Networks (Israel) Ltd., Petach Tikva (IL)

( * ) Notice: Subject to any disclaimer, the term of this patent is extended or adjusted under 35 U.S.C. 154(b) by 643 days.

(21) Appl. No.: 11/658,008

(22) PCT Filed: Jul. 13, 2005

(86) PCT No.: PCT/IL2005/000746
§ 371 (c)(1),
(2), (4) Date: Jan. 22, 2007

(87) PCT Pub. No.: WO2006/008735
PCT Pub. Date: Jan. 26, 2006

(65) Prior Publication Data
US 2007/0201462 A1 Aug. 30, 2007

(30) Foreign Application Priority Data
Jul. 19, 2004 (IL) .......................................... 163092

(51) Int. Cl.
*H04L 12/26* (2006.01)
(52) U.S. Cl.
USPC .......................................... 370/252; 370/389
(58) Field of Classification Search
None
See application file for complete search history.

(56) References Cited

U.S. PATENT DOCUMENTS

| 6,091,709 | A | 7/2000 | Harrison et al. |
| 6,259,690 | B1 * | 7/2001 | Yoshizawa et al. ........... 370/351 |
| 6,295,532 | B1 * | 9/2001 | Hawkinson ...................... 707/4 |
| 6,463,068 | B1 * | 10/2002 | Lin et al. ........................ 370/414 |
| 6,549,515 | B1 | 4/2003 | Sourani et al. |
| 6,650,644 | B1 | 11/2003 | Colley et al. |
| 6,654,373 | B1 * | 11/2003 | Maher et al. ................... 370/392 |
| 6,711,165 | B1 * | 3/2004 | Tzeng ............................. 370/392 |
| 6,724,727 | B2 * | 4/2004 | Counterman ................. 370/235 |
| 6,885,666 | B1 * | 4/2005 | Chow et al. .................... 370/392 |
| 2002/0118644 | A1 * | 8/2002 | Moir ........................... 370/230.1 |
| 2002/0169859 | A1 | 11/2002 | Serizawa |
| 2002/0199021 | A1 * | 12/2002 | Beier ............................. 709/246 |
| 2003/0012137 | A1 | 1/2003 | Abdelilah et al. |
| 2003/0223368 | A1 * | 12/2003 | Allen et al. .................... 370/235 |
| 2004/0125815 | A1 * | 7/2004 | Shimazu et al. ............... 370/411 |

FOREIGN PATENT DOCUMENTS

| EP | 1 227 624 A2 | 7/2002 |
| WO | WO 00/57606 | 9/2000 |
| WO | WO 02/15488 A1 | 2/2002 |
| WO | WO 02/030098 A2 | 4/2002 |
| WO | WO 2005/088916 A1 | 9/2005 |

OTHER PUBLICATIONS

D. Black et al., "Per Hop Behavior Identification Codes", RFC 3140 by the Internet Society for the establishment of an international standard DiffServ, Jun. 2001.

(Continued)

*Primary Examiner* — Brian Roberts
(74) *Attorney, Agent, or Firm* — Chapin IP Law, LLC (57) ABSTRACT

Method and device are provided for processing a packet conveyed in a packet switched communication network. By the invention, a processing indication is associated with the packet, where the indication is adapted to provide instruction(s) for the processing of the packet, and the indication is determined in accordance with the payload carried by that packet.

33 Claims, 2 Drawing Sheets

(56) References Cited

OTHER PUBLICATIONS

S. Blake et al., "An Architecture for Differentiated Services", IETF Standard, Internet Engineering Task Force, Dec. 1998.

J. Heinanen et al., "Assured Forwarding PHB Group" RFC 2597 by the internet Society for the establishment of an international standard DiffServ, Jun. 1999.

D. Grossman, "New Terminology and Clarifications For Diffserv", RFC 3260 by the Internet Society or the establishment of an international standard DiffServ, Apr. 2002.

IESS-501 (Rev. 2) "Digital Circuit Multiplication Equipment Specification 32KBIT/S ADPCM With DSI", and Facsimile Demodulation/Remodulation, pp. 27-29, 1992.

K. Nichols et al. "Definition of the Differentiated Services Field (DS FIED) in the IPV4 IPV6 Headers" RFC 2474 by the internet Society for the establishment of an international standard DiffServ, Dec. 1998.

H. Sanneck, "Packet Loss Recovery and Control for Voice Transmission Over the Internet" GMD Research Series No. 8/2000, of GMD—Forschungszetrum Informationechnik GmbH, 2000.

T. Zhang et al., "Audio Content Analysis for Online Audiovisual Data Segmentation and Classification", IEEE Transaction on Speech and Audio Processing, IEEE Inc., New York, US, vol. 9 No. 4, pp. 441-457, May 2001.

* cited by examiner

PROCESSING OF PACKETS INCLUDING PROCESSING INSTRUCTIONS AND FORWARDED IN COMMUNICATION NETWORKS

FIELD OF THE INVENTION

The present invention relates in general to telecommunication systems and methods for their management, and particularly to systems and methods for efficiently managing packet switched communication.

BACKGROUND OF THE INVENTION

The ever-growing traffic load in communication networks has been realized for quite some time as a problem that requires a solution. To date, some solutions were suggested to the problem. One such solution was suggested in US 20030012137 that describes a packet network congestion control system using a biased packet discard policy. Once a connection and session are established, compressed voice and data packets start flowing between the two end points of the path. A control entity supplies congestion control packets periodically. The control packets provide a "heartbeat" signal to the codec at the other end of the session. Each codec receiver uses the "heartbeat" signal as an processing indication of network congestion. As network congestion increases, routers within the network discard excess packets to prevent network failure. The network discards all packets classified as congestion control packets whenever a flow control mechanism detects congestion or a trend toward congestion. As packets are discarded, the end points renegotiate codec type and/or parameters to realize lower bit rates.

WO 0057606 describes a method for discarding data within an IP-network communications link. Initially, the IP-network communications link is monitored to determine the occurrence of an overload condition. At least some of the data packets transmitted along the IP-network communications link are selected in response to detection of the overload condition, and the selected data packets are discarded from the link, while the remainder of the packets are transmitted. When packets of real-time flow sessions are concerned, the selected data packets are those having the same source and destination IP addresses and source and destination ports, and consisting of encapsulated video, audio, etc. signals. Discarding these packets from that link allows that only a single or a few real-time flow sessions are eliminated from the link, while the remaining links' sessions are unaffected.

U.S. Pat. No. 6,091,709 discloses a packet router which is provided with priority services of the type required for isochronous handling of data representing real-time voice, includes a Quality of Service (QoS) management system for ensuring that guarantees associated with such priority service can be met with a high degree of certainty. This management system provides prioritized queues including a highest priority queue supporting reservations for the priority service suited to isochronous handling. The highest priority queue and other queues are closely monitored by a QoS manager element for states of near congestion and critical congestion. While neither state exists, filler packet flows are promoted from lower priority queues to the highest priority queue, in order to keep the latter queue optimally utilized. If all lower priority queues are empty at such times, dummy packets which will be discarded by stations receiving them, are inserted as filler flows. When a state of near congestion exists, the QoS manager demotes filler flow units from the highest priority queues to lower priority queues, in order to lessen the potential forwarding delays presented to real traffic occupying the highest priority queue. When a state of critical congestion exists in the highest priority queue, admission of new incoming traffic flows to that queue is suspended and forwarding of filler flows from that queue out to the network is also suspended.

The following publications were published as Requests For Comments (RFCs) by the Internet Society for the establishment of an international standard DiffServ: RFC 2474 "Definition of the Differentiated Services Field (DS Field) in the Ipv4 and Ipv6 Headers", by K. Nichols et al., December 1998; RFC 2475 "An Architecture for Differentiated Services", by S. Blake et al., December 1998; RFC 2597 "Assured Forwarding PHB Group". By J. Heinanen et al., June 1999; RFC 2836 "Per Hop Behavior Identification Codes", by D. Black et al. June 2001; and RFC 3260 "New Terminology and Clarifications for Diffserv" by D. Grossman, April 2002.

However, as may be appreciated, these solutions are either directed to solve overload problems or to ensure quality of service. However, none of these publications disclose how to carry out different processing of various packets (or their parts, if applicable) belonging to the same signal, so as to allow optimizing the network resources.

In our co-pending application, IL 160921, a method for managing varying traffic load in a packet switched communication network is disclosed. By this method the active channels carrying traffic are divided into groups and a rate adjusting mechanism is applied thereon when the available bandwidth is less than the bandwidth required. The application of the rate adjusting mechanism is done while ensuring that a substantially equalized signal quality is maintained for traffic delivered via all of the active channels belonging to certain group(s).

Still, even this solution does have certain drawbacks as it is more suitable for actions to be taken near a point where the rate adjustment is applied on the delivered traffic, and does not necessarily provide a solution that ensures certain quality to certain channels and/or signals further downstream.

The disclosures of all references mentioned above and throughout the present specification are hereby incorporated herein by reference.

SUMMARY OF THE INVENTION

It is therefore an object of the present invention to provide a method for improving the managing of packet switched networks.

It is yet another object of the present invention to provide a system and an apparatus capable of managing telecommunication traffic load in accordance with the availability of the system resources.

It is still a further object of the present invention to provide a method and apparatus for optimizing the processing of signals under different network resources' constrains.

Other objects of the invention will become apparent as the description of the invention proceeds.

In accordance with one embodiment of the present invention, there is provided a method for processing a packet conveyed in a packet switched communication network. The method comprises associating the packet with a processing indication to allow its processing, and wherein the indication is determined in accordance with parameters associated with the packet's payload and/or the payload of its neighboring packets, with the signal classification, etc. This indication may refer to the processing of all the information comprised in the packet or in the alternative to information comprised in part of the packet. By another alternative, the indication may relate to both information comprised in the whole packet as well as to particular information comprised in part of the packet, while these processing instructions are used in accordance with the applicable conditions. For example, under certain load conditions the processing instructions which relate to information comprised in the whole packet will be used, while under different load conditions the processing instructions which relate to part of the packet will be applied, and the information comprised in the remaining part of the packet may either be processed in accordance with a default procedure, or not processed at all.

In accordance with another embodiment of the present invention there is provided a method for processing a signal comprising a plurality of packets that is being forwarded in a packet switched communication network. The method comprises providing to at least one packet out of the plurality of packets with a first processing indication to allow processing of that at least one packet and providing at least one other packet out of the plurality of packets with a second processing indication to allow a different processing of the at least one other packet.

The term "packet" as used herein, should be understood also to encompass both a full packet as well as a part of a packet. For example, the first and second processing indications referred to hereinbefore may relate each to a part of a packet, so that the processing that should take place in accordance with the appropriate processing indication, shall be carried out for the respective part of the packet, while the remaining of the packet may either be processed in accordance with a default processing method applied in that packet switched communication network (e.g. a default defined per the signal type) or alternatively can remain unprocessed.

According to a preferred embodiment of the invention, the signal is a multimedia signal. Preferably, it is a video type of signal.

By yet another embodiment, the present invention also encompasses cases whereby different processing indications may be associated with different parts of a single packet. For example, let us consider a voice type signal which is typically associated with high priority according to prior art packet switched systems. The present invention provides by this embodiment the use of different processing indication(s) that are associated with certain packets or parts of packets that do not carry important information, or carry relatively less important information than their neighbors. Thus, according to this processing indication (or processing indications), even though the signal to which these packets (or part(s) thereof) belong, is provided with high priority, still they some times be discarded downstream if required, e.g. under congestion conditions, etc. In other words, there could be cases where certain packets will be processed in accordance with the high priority provided for the signal to which they belong, while other packets, belonging to the very same signal will be processed differently, in accordance with the indications associated therewith.

The term "packet switched communication network" as will be used hereinafter, should be understood to encompass the various types of networks known in the art, such as synchronous and asynchronous transfer networks, for example ATM networks, Ethernet networks, IP networks, frame relaying networks, Metropolitan Area Networks (MAN), Wide Area Networks (WAN), Local Area Network (LAN), packet over SONET/SDH networks, and the like.

According to a preferred embodiment of the present invention, the processing indication comprises at least one bit.

Preferably, the processing indication is a result of any combination comprising at least one member of the group that consists of:

1) minimum quality of service guaranteed for a signal to which the packet associated with the processing indication belongs;
2) priority guaranteed for forwarding a signal to which the packet associated with the processing indication belongs;
3) delay characteristics of a signal to which the packet associated with the processing indication belongs;
4) committed information rate ("CIR") for a signal to which the packet associated with the processing indication belongs;
5) loss of information allowed for a signal to which the packet associated with the processing indication belongs; and
6) degradation of a signal to which the packet associated with said processing indication belongs, that has already been accumulated during conveying the packet.

The member minimum quality of service guaranteed for the signal, may be determined in accordance with the present invention by any way known to a person skilled in the art e.g. in accordance with a service level agreement signed with the provider that conveys this signal.

Similarly, the member priority guaranteed for the signal may also be determined in accordance with the present invention by any way known to a person skilled in the art. For example, if the signal is a signaling type of signal it will receive a higher priority value than a voice type of signal, which will in turn receive a higher value than a data type of signal. Optionally, or in the alternative, this priority may be determined according to the information carried by the specific packet.

The member delay characteristics may comprise an absolute value associated with the maximum delay allowed for that packet. Optionally, or in the alternative, it may comprise a relative value that takes into account that has already been accumulated during the conveying of the packet till that point. Preferably, this related value may take into account also the delay that will be added to that packet by the device receiving the packet along the path and/or the delay that will be accumulated at the next link along which the packet is about to be conveyed. Preferably, the value of the maximum delay allowed is equal to the initial delay allowed from which each device along the path subtracts the delay that the packet will be subjected to by that device and/or its uplink. Still optionally or in the alternative, this parameter may be dependent on packet delay variation (PDV), e.g. the delay distribution between minimum delay allowed and maximum delay allowed.

The member CIR (Committed Information Rate) is typically associated with the bandwidth to which the service provider is committed to provide for the conveying of the signal (stream of packets) to which the packet belongs.

The member "loss of information allowed" may be associated with overall signal considerations such as packet discarding ratio allowed, and/or with the level of packet compression allowed, where the latter is associated a value regarding whether the packet can be compressed (Y/N), or alternatively, with the value of the maximum allowed compression level for that packet. As will be appreciated by those skilled in the art, this parameter may be further associated with any other mechanisms used which result in losing some of the information contained in the signal or in certain packets thereof. When the level of packet compression allowed is taken into effect, the value of this parameter may take into account also the impairments accumulated along the path traversed up to the device receiving the packet. Preferably, the maximum compression level allowed is equal to the compression level allowed modified by each device along the path, based on the impairments that have already been accumulated.

As previously explained, the processing indication provided to the various packets may depend on one or more of these parameters.

According to a preferred embodiment of the invention, each processing indication value is translated for each device that is about process the packet, into a certain value for each of the parameters selected.

Preferably, when the parameters used to determine the processing indication value of a packet comprise parameters that depend on the conveyance of the packet along the packet switched communication network, such as the maximum delay allowed (modified in accordance with the delay already accumulated), the compression allowed (modified by the impairments which were already accumulated by the packet), etc., an updated processing indication is used to replace the processing indication with which that packet arrived at a certain device. The packet will be received at the processing point, the values of the various parameters will be derived from the processing indication, and an updated processing indication will be provided to that packet (if required) before conveying it towards the receiving end thereof.

The term "algorithm" as will be used hereinafter, refers to various ways of managing the arriving signals. Such algorithms, typically operative as queue managers, and/or traffic shapers, and/or encoders and/or decoders, encompass signal relaying such as demodulation/remodulation relay or DTMF relay, native data transmission, various types of lossy or lossless compression, variable rate compression, transcoding, silence elimination, non-compressible clear channel (64 kbit/s), RTP encoder, FEC encoder, T.38 encoder, weighted fair queuing, early discarding schemes and the like. The term "rate adjusting mechanism" as used herein, refers to a mechanism to select an algorithm rate by which to adjust the bandwidth required for the signal operated on, and/or its queuing and/or its transmission.

As will be appreciated by those skilled in the art, the method provided by the present invention allows differentiated handling of a packet at each of the devices located along the path of conveying the packet. This differentiation is derived from various processing indications that may be provided to a single packet along its path as explained above, and/or from various available resources at the various processing points along that path. In such a case, it could well be that some of the packets be processed at a certain location in accordance with one algorithm at a certain rate and quality, while other packets, provided with the very same processing indication and even the same type of signals, be processed by a different algorithm (preferably, as long as there is no breach of the parameters defined by that processing indication) and be forwarded at a different quality and rate.

According to another embodiment of the present invention, the rate adjusting mechanism is dependent on the type of the transmitted signal. In other words, different mechanisms and/or processing methods may be applied for example on a multimedia or voice type of signal as opposed to a facsimile signal.

As can be appreciated by those skilled in the art, the method described hereinabove could be applied not only on signals received in their non-compressed form, but also on signals received in their already compressed (e.g. encoded) form, in which case the signals may either be left in their compressed mode, or be further compressed or transcoded, if so required. Naturally, if the bandwidth available is more than the bandwidth required, a decision may be taken to improve the signal quality by adding protection (adding redundant information to ensure better quality transmission of the signal) or to decompress (or at least partially decompress) such compressed signals. Preferably, the rate adjusting mechanism comprises replacing of at least one processing method associated with at least one active channel with another appropriate processing method, in accordance with a pre-defined scheme associated with such at least one processing method. Also, as would be appreciated by those skilled in the art, replacing of an processing method with another appropriate processing method, encompasses using the same algorithm but at different rates.

According to still another embodiment of the present invention, the processing point is an apparatus being a member selected from the group consisting of: a bearer, a switch, a router, border gateway and a media gateway.

By yet another embodiment of the invention, the rate adjusting mechanism comprises applying a processing method on a packet received, which processing method is a member selected from the group consisting of: PCM, ADPCM, CS-ACELP, LD-CELP, MPNLQ, ACELP, AMR, EVRC, SMV, QCELP, VBD Relay, FEC/no FEC, RTP encoder/decoder, T.38 encoder/decoder, MPEG1, MPEG2, MPEG4, MPEG3, H.264, and the like.

According to another aspect of the invention there is provided a packet forwarding device which comprises:

an input interface adapted to receive a packet that is to be forwarded in a packet switched network;

a processor coupled with said input interface and adapted to analyze a first processing indication associated with the packet, if such a processing indication exist, and to operate on the packet according to processing instructions retrieved from that first processing indication, and wherein the processor is further adapted to associate the packet with a second processing indication determined in accordance with the payload of the packet and/or of its neighboring packets; and a conveying means adapted to forward the packet towards its respective destination in accordance with the processing instructions associated with the second processing indication.

By another embodiment of the invention, the first processing indication and the second processing indication are essentially identical processing indications.

By yet another embodiment of the invention, at least one of the first and second processing indications relates to a part of the packet with which that at least one indication is associated. In addition or in the alternative, at least one of the first and second processing indications relates to processing both the whole packet and part of the packet, while the appropriate processing is applied under the corresponding network conditions.

In accordance with still another embodiment of the invention, there is provided a packet forwarding device which comprises:

an input interface adapted to receive a first plurality of packets from one or more upstream nodes, wherein said first plurality of packets is associated with a single communication signal and comprises at least a second plurality of packets, where each of said second plurality of packets is associated with a processing indication, and wherein the processing indications associated with said second plurality of packets comprise at least two different processing indications;

a processor coupled with said input interface to associate each of said second plurality of packets with one or more processing parameters having a value that corresponds to the processing indication associated with the individual packet;

a scheduler responsive to said processor to order said second plurality of packets for conveying said second plurality of packets towards their destination under the conditions that correspond to said one or more processing parameters; and a conveying means adapted to forward said first plurality of packets towards their respective destination.

According to an embodiment of the invention the packet forwarding device further comprises at least one processor capable of checking quality of packets received, and/or checking priority associated with each of the packets received, and/or checking a delay associated with a packet received and a maximum delay allowed for that packet, and/or checking a committed information rate associated with a packet received.

According to another embodiment of the invention, the packet forwarding device further comprises at least one encoder/decoder adapted to compress packets received in accordance with the type of the signals to which these packets belong.

By another embodiment of the invention there is also provided a buffer at least one apparatus located along the transmission path, operative to store received packets (or their parts). This buffer is operative in accordance with the conditions retrieved from the various processing indications of the stored packet(s) in order to meet the operating instructions set by the parameters as defined by the respective packet indication(s). Preferably, after processing the processing indications, the parameters, relating to each or to certain indications, are being updated (if necessary), and the updated indications are associated with the respective packets before the packets are further conveyed.

According to still another embodiment of the invention, the buffer is further adapted to carry out any one or more of the following: rearranging the packets in the appropriate order e.g. based on the packets' sequence number, reducing the packet's delay variation (PDV), re-shaping the packets delay distribution and the like.

By yet another embodiment of the invention, if the apparatus is located as an edge device, e.g. at the Rx side, the buffer further allows establishing the de-jittering required to re-order the packets and reduce their delay variation in the system, by determining the required delay to be set at the buffer so as to minimize the packets delay variation while optimizing the ratio between the overall delay and the number of packets lost.

In addition, the packets' processing indications of the present invention further comprise information about changes that occurred to the respective packets along their path of transmission. When packets carrying processing indications that comprise such information are received at the appropriate apparatus, e.g. at the Rx side, the packets may be restored (to whatever extent possible) in order to minimize the impact of these changes on the signal that will eventually be received by the user.

According to yet another embodiment, the Tx side transmitter transmitting the packets is provided with information regarding the capabilities of the receiving end, the Rx, for the signal to be transmitted. In such a case, certain changes may be effected already a the Tx side, e.g. discarding packets (or parts thereof), compressing packets, etc. and based on the information provided to the Rx by the packets' processing indications (which comprise for example information about the overall signal considerations parameter), the signal may be restored in a way that conceals the impact of these changes.

BRIEF DESCRIPTION OF THE DRAWINGS

The present invention will be understood and appreciated more fully from the following detailed examples taken in conjunction with the drawing.

DETAILED DESCRIPTION OF THE INVENTION

In the modern communication traffic network, a large number of communication channels may simultaneously occupy the full bandwidth available. Examples of such applications may be found in concurrent transmissions of voice channel(s) with or without compression, fax(s), data or any combination thereof, and both in TDM and packetized networks.

As was previously explained, one of the problems that has been associated with forwarding the traffic along packetized networks is the processing of the various packets, in a way to ensure minimization of the signal's degradation at the receiving end. In order to meet this challenge, the present invention provides a method and device for forwarding packets in such packetized networks.

When a signal is forwarded along a path in a packet switched communication network, sometimes it will be required to ensure a pre-determined quality at which the signal will be received at its destination. This pre-determination can result from any number of reasons. For example, guaranteed quality for traffic delivered by a service provider in accordance with an SLA, minimum quality required for that type of signal to allow its reception at the receiving end at a still reasonable quality, etc.

The solution provided by the present invention is to associate at least some, or preferably all, of the packets that together comprise the forwarded signal, with an indication that includes "instructions" how to process the packet (or a part of the packet) that each indication is associated with. As will be appreciated by those skilled in the art, a further improvement may be achieved if only part of the packets are provided with such indications, while the other can be processed either in accordance with pre-defined processing instructions. In addition or in the alternative, packets that are not provided with such an indication may be processed in accordance with the latest indication received which was associated with a packet that belongs to the same signal that the now-to-be processed packets which do not carry such indication, belong. This way, the indication is associated with a packet only when a change in the processing instructions is to be effected.

By way of example, the indication is constructed at each processing point from a look-up table provided thereat in the following way. A number of parameters that will have an effect on the way the various packets will be processed, are selected. Such parameters may either one of the following: the minimum quality of service guaranteed for the signal; a priority guaranteed for the signal; delay characteristics; committed information rate ("CIR"); and loss of information allowed, or any combination thereof. Different values are assigned for each of the selected parameters, and each combination that is comprised of certain value per selected parameter, is associated with a single value of the indication. Let us consider a simple example where the parameters selected are minimum quality guaranteed, the priority and the delay. One may divide for the sake of simplicity each of these parameters into three levels (e.g. high, medium, low, or 1, 2 and 3, etc.). Thus, there would be 9 indication values, each describing a different combination of all three parameters. The value of this indication, which is expressed in at least one bit, and is preferably carried within the packet, e.g. as part of the packet's header, allows a proper processing of the packet at the next processing node.

TABLE 1

Examples of indications and parameters associated therewith

| indication | parameter | maximum delay allowed [msec] | discarding priority | compression allowed |
|---|---|---|---|---|
| 0 0 0 0 | | 300 | 1 | ADPCM 32 kbit |
| 0 0 0 1 | | 300 | 2 | ADPCM 40 kbit |
| 0 0 1 0 | | 60 | 3 | CS-ACELP |
| 0 0 1 1 | | 60 | 4 | CS-ACELP |

Let us now consider few examples to demonstrate the use of the above table. A packet that carries an active speech signal, may be provided with the indication "0010", meaning that the maximum delay allowed is 60 msec, the relevant discarding policy for this packet is 3 (where the value "4" indicates a policy whereby the packet may be relatively easily discarded while the value "1" indicates a packet that should not be easily discarded), and the maximum compression allowed is by the CS-ACELP algorithm (i.e. to about 8 Kbit/s). For a packet that comprises silence, the indication 0011 may be used, which uses basically the same parameters as those associated with the previously described indication, with the exception that this packet can more easily be discarded than the packet that carries active speech signal.

Assuming that the signal is a fax signal, in which case a packet carrying T.30 commands (DIS, DCS etc.) may be associated with the indication "0000" while a packet carrying fax images (i.e. fax pages) may be associated with the indication "0001". That means that the packet carrying the T.30 commands using a 300 bps V.21 modulation scheme, may be compressed into less bandwidth than a packet carrying fax image, using 9600 bps v.29 modulation scheme (to 32 Kbit compared with 40 Kbit for the latter), but will be less subjected to discarding than the fax image carrying packet, due to the typical sensitivity of fax machines to loss of commands.

As previously explained, typically, there will be two or more different indications associated with different packets, even if the packets belong to the same signal. For example, parameters like minimum quality guaranteed, priority, etc. are usually determined per customer and are likely to be the same for all packets belonging to the signal being forwarded. On the other hand, the delay accumulated may vary from packet to packet, e.g. depending on the path along which that specific packet was forwarded, queues on the way, etc. Consequently, there could be cases where even two consecutive packets will each be associated with a different processing indication, and be processed differently, to allow the end result, i.e. the signal received at the receiving end of the path, to be the best possible under the network resources.

In accordance with an embodiment of the present invention, the processing indication to be associated with a certain packet is determined based on the payload carried by the packet and/or by its neighboring packets.

Let us now consider the following example. Suppose that the signal carried by a number of packets is a constant tone signal, which means that the payloads carried by the packets relate to parts of the signal, each having essentially the same characteristics as that carried by other packets (e.g. intensity, spectrum etc.). In such a case, if some of the intermediate packets are lost, a concealment of the signal can be made, by using the information carried by their neighboring packets. Therefore, the indication that will be carried by the intermediate packets may be such that allows higher discarding probability than other packets which carry payload that is substantially different from the payload carried by their neighboring packets.

A process of determining values of certain parameters, ones that may be varied along the forwarding path, is exemplified in the following example.

Figure 1:
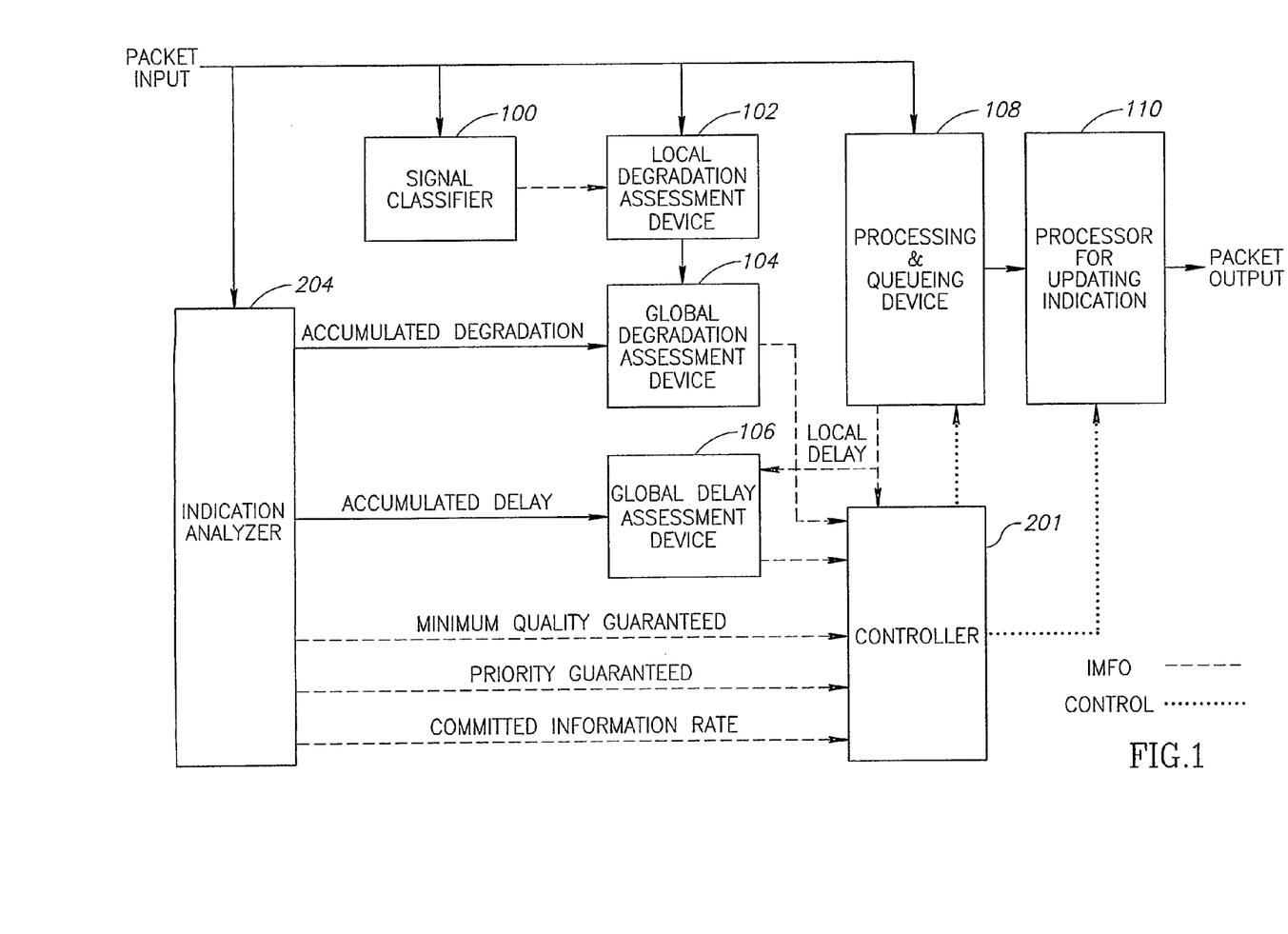
FIG. 1 illustrates a schematic representation of a traffic-handling device constructed and operative in accordance with an embodiment of the present invention.

FIG. 1 illustrates a schematic representation of a traffic-handling device 10 constructed and operative in accordance with an embodiment of the present invention.

Once a packet arrives at traffic-handling device 10, the signal carried by the packet is classified by signal classifier 100 to establish its type, e.g. a voice signal, a facsimile signal, a modem signal, a data signal, a DTMF signal, video signal, etc. The indication associated with the packet is analyzed by indication analyzer 204, and the processing instructions provided through the use of that indication, are retrieved. The signal carried by the packet is also forwarded to local degradation assessment 102, which operation will be further explained in connection with FIG. 2. The decision made at local degradation device 102 is forwarded to global degradation device 104 together with information retrieved from the packet's indication by indication analyzer 204 that relates to the already accumulated degradation.

Information that relates to the delay accumulated by the packet and retrieved from its indication is forwarded by indication analyzer 204 to global delay assessment device 106, and based on that information a global delay assessment is made. The global delay assessment together with the global degradation assessment made by device 104, and other parameters that relate to the packet indication such as minimum quality required, priority guaranteed and committed information rate, are all forwarded to controller 201.

Based on all the information receives, controller 201 provides processing and queuing instructions to unit 108 in order to have the packet processed (e.g. through the use of the appropriate encoder) and buffered in a way that satisfy (to the extent possible) all the processing instructions derived from the packet's indication under the system available resources. Once the packet is ready to be forwarded towards its next station, processor 110 will associate an appropriate updated indication (if necessary) with the packet while replacing the previous indication with which the packet arrived at device 10, and the packet will then be forwarded.

Figure 2:
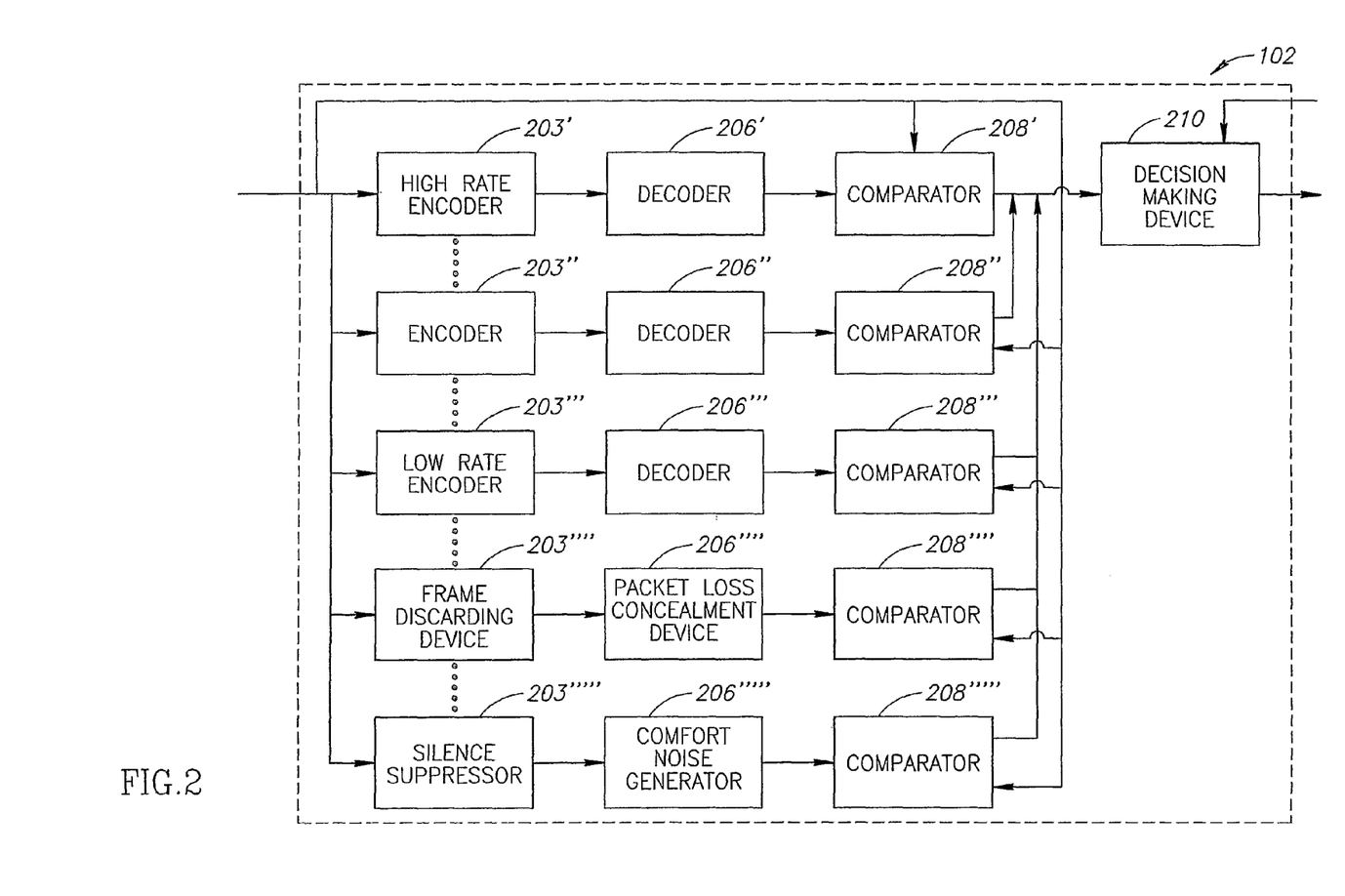
FIG. 2 illustrates a schematic detailed representation of the local degradation assessment device comprised in the traffic-handling device of FIG. 1.

Let us revert now to FIG. 2 which illustrates the operation of local degradation assessment device 102, according to this example. The arriving is forwarded to multiple algorithm/rate encoders of device 102 that conforms to the signal's type and the processing instructions provided by the packet's indication. The packet is then replicated at a number of encoders 203', 203", 203''', and preferably a near zero bit encoder (frame discarding device 203"" and/or silence suppressor 203""'), each adapted to operate on that packet at a transmission method different than the others. Each of these encoders' outputs is forwarded through the corresponding decoders (206', 206", 206''', 206"", 206""') and then to the appropriate comparator (208', 208", 208''', 208"", 208""') where each of the differently processed copy of the signal is compared with the original signal received, and the degradation of the signal as encoded by each of the encoders, is estimated. These estimations are then forwarded to a decision-making processor 210 together with the processing instructions, where a matrix matching the quality estimation with the transmission method, can be prepared. In addition, the transmission method could be evaluated by the decision making processor and/or the various comparators, to determine its effect on the quality of the related signal.

The data received is collected and processed, and a quality function, which may depend upon one or more of the above-mentioned parameters, is established. Preferably, this function is a multi-dimensional function (e.g. a three dimensional function), which matches a quality value for each pair of a transmission method and a delay parameter, under constrain(s) presented by the processing instructions. In other words, an array is formed wherein for each given pair of transmission method (typically, the rate values are taken as those of the various 203 encoders) and delay values, there is a matching quality value that represents the quality of the packet that was processed at the corresponding rate and by the corresponding algorithm.

The local degradation assessment based on the quality estimation is then made and can be forwarded to global degradation assessment device 104 which receives also the input regarding the already accumulated degradation.

It is to be understood that the present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to"

The invention claimed is:

1. A method of processing a first packet belonging to a first communication signal that comprises a header and a payload and is conveyed in a packet switched communication network, wherein said method comprises:
    determining a first processing indication based on the payload of said first packet and/or on a payload of at least one of its neighboring packets to provide first processing instructions for said first packet,
    wherein said first communication signal further comprises a second packet associated with a second processing indication, different from the first processing indication, thereby enabling different processing of said first packet and said second packet associated with said second processing indication, and
    wherein said first processing indication represents:
    (1) delay characteristics of said first communication signal to which the first packet belongs; and
    (2) accumulated degradation characteristics of said first communication signal that have accumulated during conveying of said first packet,
    the method further comprising:
    forwarding said first communication signal through a plurality of encoders and corresponding decoders and providing a corresponding plurality of processed copies of the first communication signal;
    comparing each processed copy with the first communication signal and estimating a corresponding degradation value;
    determining a quality function based on said degradation values; and
    processing said first racket as a function of said first processing indication said delay characteristics, said accumulated degradation characteristics and said quality function.

2. The method according to claim 1, wherein said first processing indication is associated with at least a part of the first packet.

3. The method according to claim 1, wherein different parts of said first packet are associated with different processing indications.

4. The method according to claim 1, wherein said first processing indication further represents at least one of:
    (1) minimum quality of service guaranteed for said first communication signal to which the first packet belongs;
    (2) priority guaranteed for forwarding said first communication signal to which the first packet belongs;
    (3) committed information rate (CIR) for said first communication signal to which the first packet belongs; and
    (4) loss of information allowed for said first communication signal to which the first packet belongs.

5. The method according to claim 4, wherein said minimum quality of service guaranteed is determined in accordance with a service level agreement signed with a provider that conveys said first communication signal in said packet switched communication network.

6. The method according to claim 4, wherein said priority guaranteed is determined in accordance with a type of said first communication signal to which said first packet belongs.

7. The method according to claim 4, wherein said priority guaranteed is determined in accordance with the information carried by said first packet.

8. The method according to claim 4, wherein said priority guaranteed is determined in accordance with a service level agreement signed with a provider that conveys said first communication signal in said packet switched communication network.

9. The method according to claim 4, wherein said Committed Information Rate is associated with a bandwidth to which a service provider is committed to provide for conveying said communication signal to which said first packet belongs.

10. The method according to claim 4, wherein said loss of information allowed is associated with an allowed packet discarding ratio, an allowed level of signal compression, or any combination thereof.

11. The method according to claim 1, wherein said delay characteristics comprise a maximum delay allowed for said first packet.

12. The method according to claim 1, wherein in case said first communication signal to which the first packet belongs has already been conveyed along said transmission path extending in said packet switched communication network, said delay characteristics comprise a delay that takes into account delay that has already been accumulated during conveying of said first packet.

13. The method according to claim 12, wherein said accumulated delay further comprises a known delay that is expected be added to that first packet along the remaining of its transmission path.

14. The method according to claim 1, wherein a replacement processing indication is associated with said first packet, and is adapted to replace said first processing indication so as to ensure that said first packet is provided with an updated processing indication.

15. The method according to claim 1, wherein said first processing indication further comprises information about changes that occurred to said first packet along its path of transmission.

16. The method according to claim 15, further comprising applying the information about changes that occurred to said first packet, in a process of restoring said first packet.

17. The method according to claim 1, wherein said first processing indication comprises at least one bit.

18. The method according to claim 1, wherein said packet switched communication network is selected from among Asynchronous Transfer Mode (ATM) networks, Ethernet networks, Internet Protocol (IP) networks, frame relaying networks, metropolitan area networks, wide area networks, local area networks and packet over Synchronous Optical Networking (SONET)/Synchronous Digital Hierarchy (SDH) networks.

19. The method according to claim 1, further comprising processing said first packet in accordance with said first processing indication at a device which is a member of the group consisting of:
a bearer,
a switch,
a router,
a border gateway, and
a media gateway.

20. The method according to claim 1, further comprising a step of providing, at a transmission end of a path along which said first packet would be forwarded, information that relates to capabilities of a receiving end of said path.

21. The method according to claim 1, further comprising a step of discarding a number of packets out of a plurality of packets belonging to said communication signal prior to their transmission in accordance with capabilities of a receiving end of a communication path, and providing the remaining packets of said plurality of packets with appropriate processing indications that will allow restoring and concealing an impact of said discarding step.

22. The method according to claim 1, further comprising applying a rate adjusting mechanism to select an algorithm by which to adjust a bandwidth required for said communication signal, or its queuing, or its transmission, or any combination thereof.

23. The method according to claim 22, wherein said algorithm is a member of the group consisting of queue managers, traffic shapers, encoders, decoders, demodulation/remodulation relay, Dual-tone multi-frequency (DTMF) relay, native data transmission, lossy compression, lossless compression, variable rate compression, transcoding, silence elimination, non-compressible clear channel, Real-time Transport Protocol (RTP) encoder, forward error correction (FEC) encoder, T.38 encoder, weighted fair queuing, early discarding schemes or any combination thereof.

24. The method according to claim 1, wherein said communication signal is a multimedia signal.

25. The method according to claim 24, wherein said multimedia signal is a video type of signal.

26. A packet forwarding device, comprising:
an input interface adapted to receive a first packet belonging to a first communication signal that comprises a header and a payload and is to be forwarded in a packet switched network;
a processor coupled with said input interface and adapted to analyze a first processing indication associated with said first packet, if such a first processing indication exists, and to operate on said first packet according to processing instructions retrieved from that first processing indication,
wherein said first processing indication is determined based upon the payload of said first packet and/or upon a payload of at least one of its neighboring packets,
wherein said first communication signal further comprises a second packet associated with a second processing indication, different from the first processing indication, to enable different processing of said first packet and said second packet associated with said second processing indication, and
wherein said processor is further adapted to associate said first packet with a third processing indication providing one or more processing instructions for said first packet, and wherein said third processing indication is determined based upon the payload of said first packet and/or a payload of at least one of its neighboring packets belonging to said communication signal, to allow processing of said first packet by another device associated with said packet switched network; and
said packet forwarding device further comprises a transmitter adapted to forward said first packet towards its respective destination in accordance with said third processing indication, and
wherein said first processing indication represents:
(1) delay characteristics of said first communication signal to which the first packet belongs; and
(2) accumulated degradation characteristics of said first communication signal that have accumulated during conveying of said first packet,
wherein said packet forwarding device further comprises a degradation assessment device adapted to:
forward said first communication signal through a plurality of encoders and corresponding decoders and provide a corresponding plurality of processed copies of the first communication signal;
compare each processed copy with the first communication signal and estimate a corresponding degradation value; and
determine a quality function based on said degradation values,
wherein said processor is coupled to said degradation assessment device and is further adapted to:
process said first packet as a function of said first processing indication, said delay characteristics, said accumulated degradation characteristics and said quality function.

27. The packet forwarding device according to claim 26, wherein at least one of said first and third processing indications relates to a part of the first packet with which said at least one of said first and third processing indications is associated.

28. The packet forwarding device according to claim 26, wherein:
said input interface is adapted to receive a first plurality of packets from one or more upstream nodes, wherein said first plurality of packets is associated with a single communication signal and comprises at least a second plurality of packets, where each of said second plurality of packets is associated with a processing indication providing one or more processing instructions for a respective packet, wherein said processing indication is determined in accordance with parameters associated with a payload of said respective packet, and wherein the processing indications associated with said second plurality of packets comprise at least two different processing indications;

said processor coupled with said input interface to associate each of said second plurality of packets with one or more processing parameters having a value that corresponds to the processing indication associated with an individual packet;

wherein said packet forwarding device further comprises a scheduler responsive to said processor to order said second plurality of packets for conveying said second plurality of packets towards their destination under conditions that correspond to said one or more processing parameters; and wherein said transmitter is adapted to forward said first plurality of packets towards their respective destination.

29. The packet forwarding device according to claim 28, further comprising at least one processor capable of checking at least one of:

quality of packets received, priority associated with each received packet, a delay associated with each received packet, a committed information rate associated with each received packet, and any combination thereof.

30. The packet forwarding device according to claim 28, further comprising at least one encoder/decoder adapted to compress packets received in accordance with types of the signals to which said received packets belong.

31. The packet forwarding device according to claim 28, further comprising a buffer operative to store received packets and operate thereon in accordance with instructions retrieved from parameters associated with processing indications associated with said received packets.

32. The packet forwarding device according to claim 31, wherein said buffer is adapted to allow rearranging of stored packets in an appropriate order.

33. The packet forwarding device according to claim 31, adapted to be located at a receiving end of a transmission path along which said received packets would be forwarded and wherein storing said received packets in said buffer further allows establishing de-jittering required to reduce packets' delay variation in said packet switched network.

* * * * *